(12) United States Patent
Pasqualino

(10) Patent No.: US 8,378,860 B2
(45) Date of Patent: Feb. 19, 2013

(54) METHOD AND SYSTEM FOR GENERATING HIGH DEFINITION MULTIMEDIA INTERFACE (HDMI) CODEWORDS USING A TMDS ENCODER/DECODER

(75) Inventor: Christopher R. Pasqualino, Glendora, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/481,502

(22) Filed: Jun. 9, 2009

(65) Prior Publication Data

US 2010/0135380 A1    Jun. 3, 2010

Related U.S. Application Data

(63) Continuation of application No. 12/166,038, filed on Jul. 1, 2008, now Pat. No. 7,561,074, which is a continuation of application No. 10/625,974, filed on Jul. 24, 2003, now Pat. No. 7,394,406.

(60) Provisional application No. 60/434,074, filed on Dec. 17, 2002.

(51) Int. Cl.
*H03M 7/38*    (2006.01)
(52) U.S. Cl. ............................ 341/51; 341/50
(58) Field of Classification Search .............. 341/50, 341/51, 101; 348/473, 476; 375/E7.279
See application file for complete search history.

(56) References Cited

U.S. PATENT DOCUMENTS

| | | | | |
|---|---|---|---|---|
| 6,897,793 B1 * | 5/2005 | Kim et al. | ........................ | 341/59 |
| 6,914,637 B1 * | 7/2005 | Wolf et al. | ..................... | 348/473 |
| 7,120,203 B2 * | 10/2006 | Bauch et al. | .................. | 375/295 |
| 7,259,589 B1 * | 8/2007 | Hui et al. | ........................ | 326/63 |
| 7,363,575 B2 * | 4/2008 | Chung | ........................... | 714/759 |
| 7,558,326 B1 * | 7/2009 | Lyle et al. | ...................... | 375/244 |
| 2002/0163598 A1 | 11/2002 | Pasqualino | | |
| 2004/0049592 A1 * | 3/2004 | Yurusov | ........................ | 709/231 |
| 2007/0103349 A1 * | 5/2007 | Liu et al. | ........................ | 341/101 |
| 2009/0219447 A1 * | 9/2009 | Choi | .............................. | 348/725 |

OTHER PUBLICATIONS

Digital Display Working Group: "Digital Visual Interface DVI" Paper, Apr. 2, 1999, pp. 1-76, XP002948299.
European Search Report—EP03024382—Search Authority—The Hague—Mar. 11, 2011.

\* cited by examiner

*Primary Examiner* — Brian Young
(74) *Attorney, Agent, or Firm* — Stanton Braden

(57) ABSTRACT

Encoding and decoding of video and non-video information may include creating a second symbol from a first codeword. TERC4, TMDS and/or a guard band symbols may be generated from a portion or all of the second symbol during transmission. The TMDS symbol and/or the guard band symbol may be encoded so that they may be combined within a single symbol. At least a portion of the first codeword may be TMDS encoded to generate a TMDS symbol for transmission. TMDS encoding of at least a portion of the second symbol may also generate a TERC4 symbol and/or a guard band symbol for the transmitted signal. The second symbol and the first codeword may be generated from a portion or all of a received signal. The first codeword may be a 4-bit pre-TERC4 codeword, while the second symbol may be an 8-bit pre-TMDS symbol.

20 Claims, 4 Drawing Sheets

METHOD AND SYSTEM FOR GENERATING HIGH DEFINITION MULTIMEDIA INTERFACE (HDMI) CODEWORDS USING A TMDS ENCODER/DECODER

CROSS-REFERENCE TO RELATED APPLICATIONS/INCORPORATION BY REFERENCE

This application is a continuation of U.S. patent application Ser. No. 12/166,038, filed Jul. 1, 2008, which is a continuation of Ser. No. 10/625,974 (now U.S. Pat. No. 7,394,406), filed Jul. 24, 2003, which makes reference to, and/or claims priority to and/or claims the benefit of U.S. Provisional Patent Application Ser. No. 60/434,074 entitled "Method for Generating HDMI Codewords with a TMDS Encoder" filed on Dec. 17, 2002.

The above stated application is incorporated by reference in its entirety.

FIELD OF THE INVENTION

Certain embodiments of the present invention relate to the field of data encoding and decoding. More specifically, certain embodiments of the present invention relate to a method and system for transmitting and receiving high definition multimedia interface (HDMI) formatted information.

BACKGROUND OF THE INVENTION

HDMI is a specification that integrates audio and video information into a single digital interface to be used with, for example, digital video disc (DVD) players, digital television (DTV), high definition TV (HDTV), set-top boxes, and other audio and/or video devices. A key element of HDMI is the ability to utilize high bandwidth digital content protection (HDCP). Notwithstanding, the high definition multimedia interface also utilizes core technologies provided by the digital visual interface (DVI). High bandwidth digital content protection provides a method for protecting copyrighted digital content that utilizes the digital visual interface by encrypting data transmitted between a source and a destination device. The source device may include, but is not limited to, a computer, a set-top box, D-VHS, or a DVD player. The receiver destination device may be a television, projector, a LCD display, or a plasma panel, for example.

The digital visual interface is a standardized protocol, which facilitates the coupling of analog and digital monitors using a single connector. The digital visual interface is a 24-bit RGB interface, which utilizes transition minimized differential signaling (TMDS), the latter of which has become quite popular. A DVI link utilizes three (3) pairs of differential digital signals, each pair carrying low voltage signals representative of the red (R), green (G) and blue (B) signal components. Each of the pairs may also carry synchronization information. Additionally, a fourth pair of wires carries a pixel clock signal. A serial 8-bit RGB signal carries information at a speed of up to 1.65 Gbps with an aggregate link speed of 4.95 Gbps, but an effective transfer rate of 3.96 Gbps. In order to minimize transitions at such high data rates, a 10-bit encoding scheme is utilized.

A DVI connector permits two links to be coupled to the connector. To minimize connector size, the two links share the same clock signal, resulting in a maximum data rate of 9.9 Gbps. DVI also includes a display data channel (DDC), which permits a video source such as a PC to communicate with a DVI capable display. The DDC utilizes a low speed, bi-directional two-wire bus similar to an I²C bus. A digital signal that is transmitted to an analog monitor may be converted into an analog signal using a DVI connector. In instances where a digital monitor is utilized, then no conversion is performed. However, in the case of an analog monitor, then D/A conversion is required. The popularity of DVI along with various standardized changes has resulted in a plethora of products now supporting DVI.

The high definition multimedia interface supports standardized, enhanced, or high-definition video formats along with multi-channel surround sound audio. Some of the benefits of high definition multimedia interface may include, but are not limited to, uncompressed digital video, a bandwidth of up to five gigabytes per second and a single connector instead of multiple connectors and cables. The high definition multimedia interface may also be adapted to facilitate communication between a video source and, for example, a DTV.

Transition minimized differential signaling is a signaling technique that produces a transition controlled, DC balanced series of characters from an input series of data bytes. In a long string of logic zeros and logic ones, bits are selectively manipulated in order to keep the DC voltage level of the overall signal centered around a particular signal threshold. Transition minimized differential signaling may use, for example, bit inversion to maintain a particular DC biased signal. A signal threshold may determine whether a received data bit is at a voltage level equivalent to logic zero (0) or at a level equivalent to logic one (1).

Various silicon-based versions of transition minimized differential signaling encoders and receivers have been developed. One version of the high definition multimedia interface implements a new coding scheme which is referred to as TERC4. The TERC4 encoding scheme maps sixteen (16) 4-bit characters to 10-bit symbols. The new encoding scheme also includes various symbols, which may be utilized as guard bands. The high definition multimedia interface specification provides an adequate description of how the guard bands may be utilized. One released revision of the bandwidth digital content protection encryption standard include various algorithms which may be utilized for encrypting of HDMI data. TERC4 symbols and guard band symbols, which may be collectively known as HDMI symbols, are 10-bits in length and have five (5) logic ones (1s) and five (5) logic zeros (0s), to ensure that they are DC balanced. In this regard, the high definition multimedia interface (HDMI) symbols are valid TMDS codewords and the HDMI codewords are mapped to a unique un-encoded TMDS byte. A one-to-one mapping may be used to map the high definition multimedia interface codewords into the unique un-encoded TMDS byte.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may include a method and system for encoding and decoding of video and non-video information. The method for encoding and decoding video and non-video information may include creating a second symbol from a first codeword. A TERC4 symbol, TMDS symbol and/or a guard band symbol may be generated from a portion or all of the second symbol, and may be part of a transmitted signal. The first codeword may be directly encoded into a TMDS codeword. In another aspect of the invention, TMDS encoding of at least a portion of the second symbol may generate a TERC4 symbol and/or a guard band symbol. The generated TERC4 symbol and the guard band symbol may be encoded so that they are combined within a single symbol for transmission.

In another aspect of the invention, the first codeword may be generated from a portion or all of a third symbol containing a TERC4 symbol and/or a guard band symbol. The generation of the codeword may occur when the third symbol is received by a receiver or a receiver portion of a transceiver. TMDS decoding of at least a portion of the received signal may generate the first codeword. Similarly, TMDS decoding of a portion or all of the received signal, which may include the third symbol, may generate the second symbol. At least a portion of the second symbol may be decoded or mapped to generate the first codeword. Notwithstanding, the first codeword may be a 4-bit pre-TERC4 codeword, while the second symbol may be an 8-bit pre-TMDS symbol.

Another embodiment of the invention may provide, a machine-readable storage, having stored thereon a computer program having at least one code section encoding and decoding video and non-video information. Then at least one code section may be executable by a machine, thereby causing the machine to perform the steps for encoding and decoding video and non-video information.

The invention may also provide a system for encoding and decoding video and non-video information. The system for encoding and decoding video and non-video information may include a first encoder adapted to encode a first codeword into a second symbol. A second encoder may generate a TMDS symbol, TERC4 symbol and/or a guard band symbol from a portion or all of the second symbol. The second encoder may be adapted to directly encode the first codeword into a TMDS symbol. The second encoder may encode at least a portion of the second symbol to generate a TERC4 symbol and/or a guard band symbol. The second encoder may generate the TERC4 symbol and the guard band symbol so that they are combined within a single symbol for transmission. The first and second encoders may be part of the same transmitter.

In another aspect of the invention, a receiver may be configured to generate the first codeword from a portion or all of a third symbol containing a TERC4 symbol and/or a guard band symbol. The generation of the first codeword may occur when the third symbol is received by a receiver or a receiver portion of a transceiver. A second decoder may be adapted to TMDS decode at least a portion of the received signal to generate the first codeword. Similarly, the first decoder may TMDS decode a portion or all of the received signal, which may include the third symbol, in order to generate the second symbol. The first decoder may be adapted to decode or map at least a portion of the second symbol to generate the first codeword. Notwithstanding, the first codeword may be a 4-bit pre-TERC4 codeword, while the second symbol may be an 8-bit pre-TMDS symbol.

These and other advantages, aspects and novel features of the present invention, as well as details of an illustrated embodiment thereof, will be more fully understood from the following description and drawings.

DETAILED DESCRIPTION OF THE INVENTION

Aspects of the invention may include a method and system for encoding and decoding video and non-video information. In accordance with an embodiment of the invention, encoding and decoding video and non-video information may include creating a second symbol from a first codeword. A TERC4 symbol, TMDS symbol and/or a guard band symbol may be generated from a portion or all of the second symbol, and may be part of a transmitted signal. The first codeword may be directly encoded into a TMDS codeword without requiring additional processing. In another aspect of the invention, TMDS encoding a portion or all of the second symbol may generate a TERC4 symbol and/or a guard band symbol. The generated TERC4 symbol and the guard band symbol may be encoded so that they are combined within a single symbol for transmission.

In another aspect of the invention, the first codeword may be generated from a portion or all of a third symbol containing a TERC4 symbol and/or a guard band symbol. The generation of the codeword may occur when the third symbol is received by a receiver or a receiver portion of a transceiver. TMDS decoding of at least a portion of the received signal may generate the first codeword. Similarly, TMDS decoding of a portion or all of the received signal, which may include the third symbol, may generate the second symbol. At least a portion of the second symbol may be decoded or mapped to generate the first codeword. Notwithstanding, the first codeword may be a 4-bit pre-TERC4 codeword, while the second symbol may be an 8-bit pre-TMDS symbol.

Figure 1:
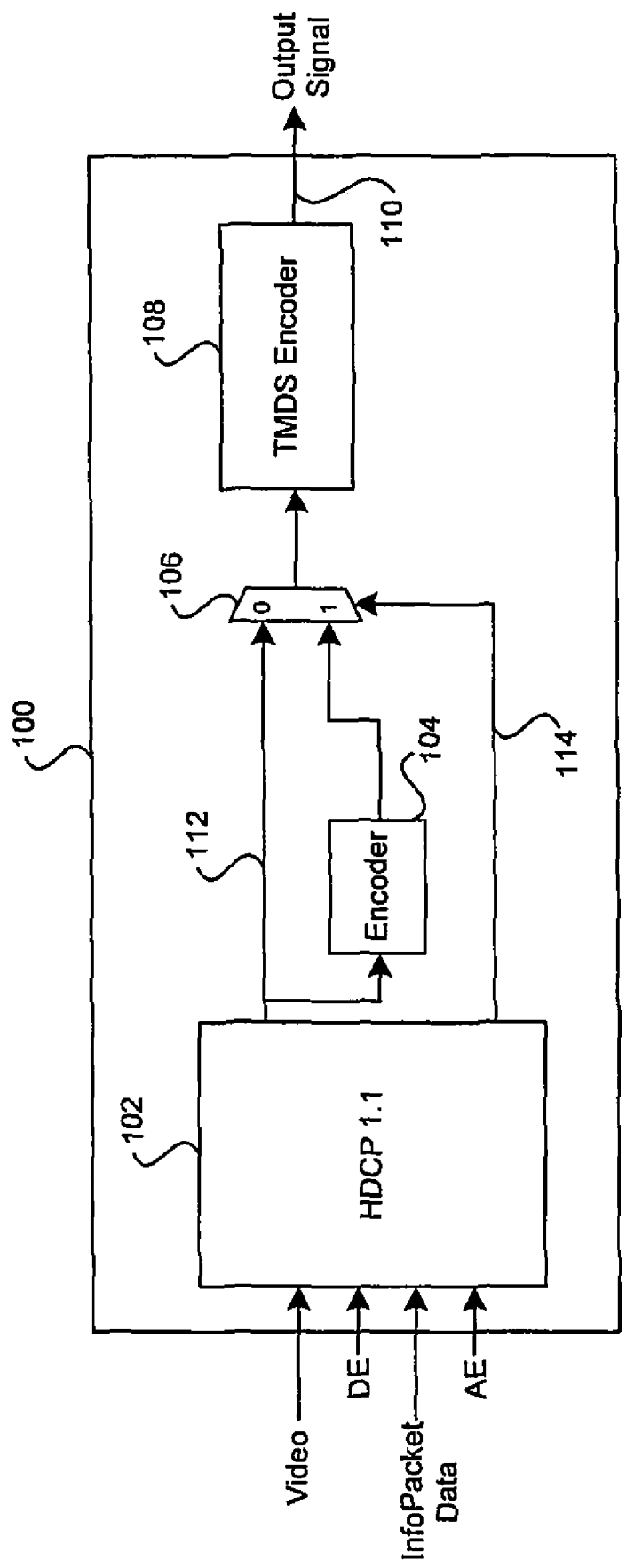
FIG. 1 is a block diagram of a transmitter adapted to facilitate TMDS and TERC4 encoding in accordance with an embodiment of the invention.

FIG. 1 is a block diagram of a transmitter adapted to facilitate TMDS and TERC4 encoding in accordance with an embodiment of the invention. Referring to FIG. 1, transmitter 100 may include an HDCP block 102, a first encoder block 104, a second encoder block 108 and a multiplexer (MUX) 106. The HDCP block 102 may include a HDCP engine and suitable logic, circuitry, software and/or code, which may be adapted to execute various aspects of the HDCP protocol. The encoder 108 may be a TMDS encoder and may include suitable logic, circuitry, software and/or code, which may be adapted to encode or otherwise process data so that is TMDS formatted.

The MUX 106 may be adapted to select between a first output 112 of the HDCP block 102 being processed by TMDS encoder block 108 and the output of encoder block 104 being encoded by TMDS encoder block 108. In this regard, output signal 114 of HDCP block 102 may be an enable signal adapted to select between the first output signal 112 and the output of encoder block 104. The HDCP block 102 may be a HDCP 1.1 block as illustrated, but the invention is not limited in this regard.

The encoder block 104 may be coupled to an output 112 of the HDCP block 102 and an input of the MUX or selector 106. The encoder block 104 may be implemented in hardware, software or a combination thereof. In hardware, the encoder block 104 may be implemented as a lookup table located in a memory, for example, but is not limited in this regard and may be hard coded. Notwithstanding, encoder block 104 may be configured so that it is inserted in the data stream or path so that it may process HDCP data formatted by the HDCP block 102.

In operation, the encoder block 104 may convert 4-bit pre-TERC4 symbols produced by the HDCP block 102, to 8-bit pre-TMDS symbols. In this case, encoder block 104 may encode or map 4-bit pre-TERC4 symbols into 8-bit pre-TMDS symbols. The output pre-TMDS symbols generated by the encoder 104 may be fed into TMDS encoder block 108 for processing. The multiplexer 106 may control the transfer of the output pre-TMDS symbols to the TMDS encoder 108. The TMDS encoder 108 may be adapted to encode the pre-TMDS symbols transferred from the encoder 104 into TERC4 symbols and/or guard band symbols, collectively referred to as HDMI symbols. The HDMI symbols encoded by the TMDS encoder block 108 may be 10-bits.

The 10-bit output generated by the TMDS encoder block 108 may include five (5) ones (1s) and five (5) zeros (0s) to ensure that the output signal is DC balanced. In a case where no encoding is necessary, then MUX 106 may be configured to transfer the 4-bit output signal 112 from the HDCP block 102 directly to the TMDS encoder block 108. In this regard, selector 106 may be adapted to bypass the operation of encoder block 104.

In another aspect of the invention, the multiplexer enable signal 114 may be driven high or logic (1), for example, for TERC4 and/or guard band symbols to be generated by encoder block 104. The output from the encoder block 104 may include suitable symbols, which when TMDS encoded, produces a TERC4 symbol, a guard band symbol, or a combination thereof. The following illustrates an exemplary table which may be used to facilitate TMDS and TERC4 encoding in accordance with an embodiment of the invention.

| pre-TERC4 (4-bits) | pre-TMDS Symbol (8 bits) | TMDS/TERC4/ Guard Band Symbol [LSB:MSB] |
|---|---|---|
| 0 | 91 | 0011100101 |
| 1 | 90 | 1100011001 |
| 2 | 211 | 0010011101 |
| 3 | 217 | 0100011101 |
| 4 | 147 | 1000111010 |
| 5 | 34 | 0111100010 |
| 6 | 164 | 0111000110 |
| 7 | 68 | 0011110010 |
| 8 | 171 | 0011001101 |
| 9 | 75 | 1001110010 |
| 10 | 164 | 0011100110 |
| 11 | 181 | 0110001101 |
| 12 | 109 | 0111000101 |
| 13 | 108 | 1000111001 |
| 14 | 165 | 1100011010 |
| 15 | 186 | 1100001101 |
| 16 (Guard Band Symbol 1) | 171 | 0011001101 |
| 17 (Guard Band Symbol 2) | 85 | 1100110010 |
| 18 (Spare Symbol 1) | programmed externally | programmed externally |
| 19 (Spare Symbol 2) | programmed externally | programmed externally |
| ... | ... | ... |
| 31 (Spare Symbol 14) | programmed externally | programmed externally |

In the first column of the table, the 4-bit pre-TERC4 symbols represents the symbols that may be generated by HDCP block 102. The second column represents the output of encoder block 104, which when encoded by the TMDS encoder block 108, produces a TMDS/TERC4/guard band formatted signal. Finally, the third column represents the TMDS encoded signal 110 which is DC balanced to ensure that transitions do not change a bias point of the signal. The 4-bit symbols illustrated in the first column of the table may be mapped into the 8-bit symbols illustrated in the second column by the encoder block 104. Finally, the 8-bit symbols produced by the encoder block 104 may be encoded to produce the TERC4 symbols or guard band symbols illustrated in the third column.

Referring to the table and FIG. 1, HDCP block 102 may generate a signal containing 4-bit pre-TERC symbol or codeword having a value of 7, for example, to be transmitted by transmitter 100. The multiplexer select signal 114 may be utilized to control MUX 106 to transfer the 4-bit pre-TERC4 codeword to decoder block 104. The encoder block 104 may receive the 4-bit pre-TERC symbol or codeword having a value of 7 and encode this codeword into an 8-bit pre-TMDS symbol having a value of 68. Accordingly, the TMDS encoder block 108 may map the 8-bit pre-TMDS symbol having a value of 68 into a corresponding guard band symbol having a value of 0011110010.

Although sixteen (16) pre-TERC4 symbols, namely 0-15, may be represented in the first column of the table, symbols may be added to ensure expandability and future compatibility. In this regard, the two (2) guard bands represent the sixteenth ($16^{th}$) and seventeenth ($17^{th}$) symbols, but other symbol locations could be used for this purpose. As a practical matter, five (5) bits will be required to represent the eighteen (18) symbols. Accordingly, there is enough space to define additional symbol mappings. These are represented as 31 spare symbols 14-31. The ability to provide additional symbols which may be defined at a later date, even post silicon, may be controlled externally to enable more symbols to be transmitted in accordance with an embodiment of the invention.

In accordance with another embodiment of the invention, the system for encoding and decoding video and non-video information as illustrated in FIG. 1, may include a first encoder 104 adapted to encode or map a first codeword into a second symbol. A second encoder block 108 may be adapted to generate a TERC4 symbol, TMDS symbol and/or a guard band symbol from a portion or all of the second symbol, if the TERC4 symbol, the TMDS symbol and/or the guard band symbol is part of a transmitted signal. The second encoder block 104 may encode the TERC4 symbol and the guard band symbol so that they are part of a single symbol. The second encoder block 108 may also TMDS encode a portion or all of the first codeword to generate a TMDS symbol for the transmitted signal. MUX 106 may select whether TMDS encoder block 108 encodes the first code word or the second symbol. The first encoder block 104 may also TMDS encode a portion or all of the second symbol to generate a TERC4 and/or a guard band symbol.

Figure 2:
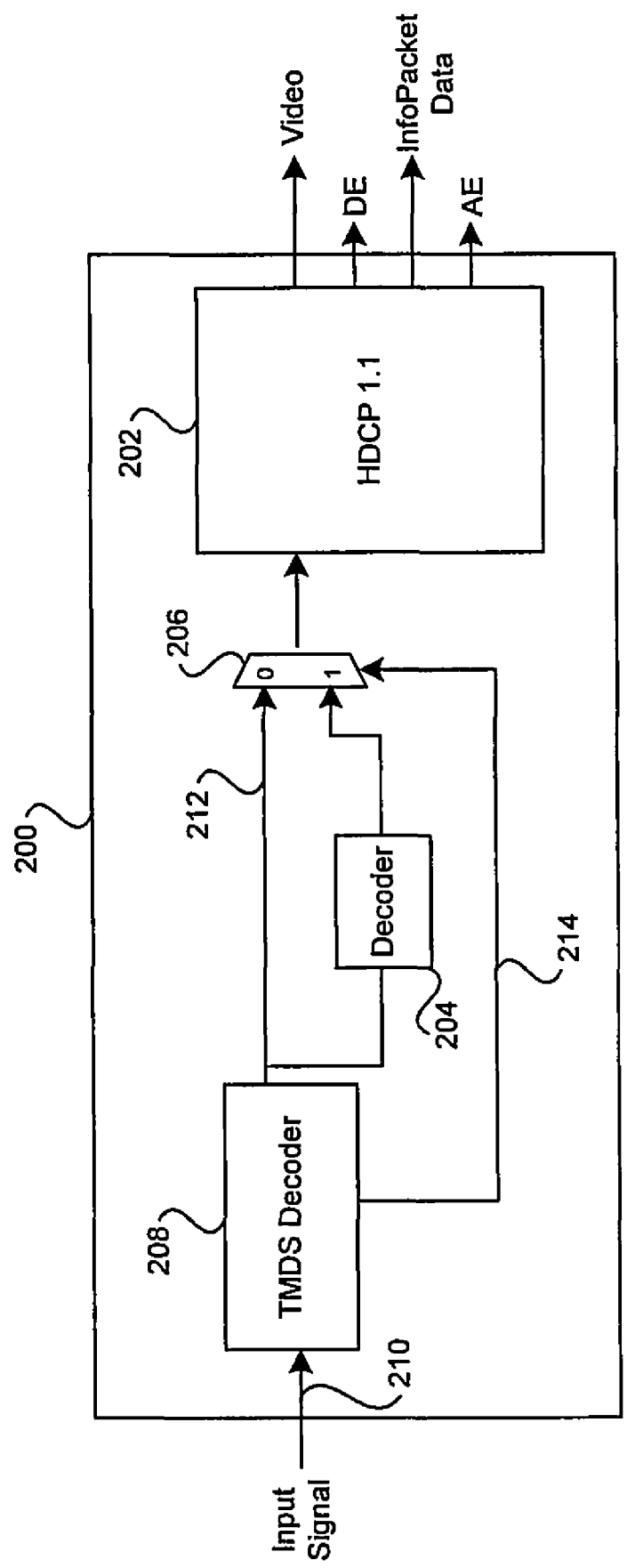
FIG. 2 is a block diagram of a receiver adapted to facilitate TMDS and TERC4 decoding in accordance with an embodiment of the invention.

FIG. 2 is a block diagram of a receiver adapted to facilitate TMDS and TERC4 decoding in accordance with an embodiment of the invention. Referring to FIG. 2, receiver 200 may include an HDCP block 202, a first decoder block 204, a second decoder block 208 and a demultiplexer (DEMUX) 206. The HDCP block 202 may include a HDCP engine and suitable logic, circuitry, software and/or code, which may be adapted to execute various aspects of the HDCP protocol. The second decoder 208 may be a TMDS decoder and may also include suitable logic, circuitry, software and/or code, which may be adapted to decode or otherwise process data so that is TMDS formatted. An input of decoder block 204 may be coupled to an output 212 of the TDMS decoder block 208.

The DEMUX 206 may be adapted to select between direct transfer of data from an output 212 of the TMDS decoder block 208 or from the TMDS decoder block 208 via decoder block 204 to HDCP block 202. The TMDS decoder block 208 may include a DEMUX select signal 214, which may be adapted to enable or disable various inputs of the decoder DEMUX 206. In this regard, DEMUX select signal 214 may select between the transfer of data directly from the TMDS decoder block 208 via TMDS decoder output 212 to the HDCP block 202. Alternatively, DEMUX select signal 214 may select between the transfer of TMDS decoder output 212 data from the TMDS decoder block 208 to HDCP block 202 via the decoder block 204.

The decoder block 204 may be coupled to an output of the TMDS decoder block 208 and an input of the DEMUX or selector 206. The decoder block 204 may be implemented in hardware, software or a combination thereof. In one aspect of the invention, the encoder block 204 may be implemented as a lookup table located in a memory, for example. However, the invention is not limited in this regard and the decoder block 204 may be hard-coded. The HDCP block 202 may be a HDCP 1.1 block as illustrated, but the invention is not limited in this regard.

In operation, decoder block 208 may convert TERC4 formatted signal back to an 8-bit pre-TMDS symbol. The decoder block 204 may convert the 8-bit pre-TMDS signal to pre-TERC4 symbols which may be processed by the HDCP block 202. In this regard, whenever the TMDS decoder block 208 receives a TERC4 and/or guard band symbol, the TMDS decoder block 208 may enable output signal 214 of DEMUX 206. This may permit the TERC4 and/or guard band symbols decoded by the decoder block 204 to be transferred to the HDCP block 202 for processing.

Decoder 204 may be adapted to decode a TERC4 symbol and/or a guard band symbol from a portion or all of a third symbol received from the TMDS decoder block 208 of receiver 200. The TMDS decoder block 208 may be adapted to TMDS decode a portion or all of the received signal to generate a first codeword which may be directly transferred via DEMUX 206 to HDCP block 202 for processing. The decoder block 208 may also decode a portion or all of the received signal to generate a second symbol that may be similar to the second symbol generated by transmitter 100. Decoder block 204 may be configured to decode or map the second symbol in order to generate a first codeword that may be similar to the first codeword generated by transmitter 100. The first codeword may be a 4-bit pre-TERC4 codeword, while the second symbol may be an 8-bit pre-TMDS symbol.

Below is a table illustrating exemplary codewords and symbols that may be generated by receiver 200 of FIG. 2. The first column of the table represents the TMDS, TERC4 and/or guard band symbols that may be received in an input stream by the TMDS decoder block 208. The second column represents the pre-TMDS symbol generated by the decoder block 204, which when it is decoded by the HDCP block 202, results in the pre-TERC codeword or symbol illustrated in the third column.

| TMDS/TERC4/<br>Guard Band Symbol<br>[LSB:MSB] | pre-TMDS<br>Symbol<br>(8 bits) | pre-TERC4<br>(4-bits) |
|---|---|---|
| 0011100101 | 91 | 0 |
| 1100011001 | 90 | 1 |
| 0010011101 | 211 | 2 |
| 0100011101 | 217 | 3 |
| 1000111010 | 147 | 4 |
| 0111000010 | 34 | 5 |
| 0111000110 | 164 | 6 |
| 0011110010 | 68 | 7 |
| 0011001101 | 171 | 8 |
| 1001110010 | 75 | 9 |
| 0011100110 | 164 | 10 |
| 0110001101 | 181 | 11 |
| 0111000101 | 109 | 12 |
| 1000111001 | 108 | 13 |
| 1100011010 | 165 | 14 |
| 1100001101 | 186 | 15 |
| 0011001101 | 171 | 16<br>(Guard Band Symbol 1) |
| 1100110010 | 85 | 17<br>(Guard Band Symbol 2) |
| programmed externally | programmed externally | 18<br>(Spare Symbol 1) |
| programmed externally | programmed externally | 19<br>(Spare Symbol 2) |
| . . . | . . . | . . . |
| programmed externally | programmed externally | 31<br>(Spare Symbol 14) |

Accordingly, when a signal containing symbol 0011110010, for example, is received by TMDS decoder 208, the TMDS decoder block 208 may enable an input 218 of DEMUX 206 to transfer a decoded output corresponding to symbol 0011110010 from decoder block 204 to the HDCP block 202. In this regard, the decoder block 204 may generate or map the symbol 0011110010 to an 8-bit pre-TMDS symbol having a value of 68. The 8-bit pre-TMDS symbol having a value of 68 may then be transferred to the HDCP block 202 where it may be mapped into the 4-bit pre-TERC symbol or codeword having a value of 7.

Although sixteen (16) pre-TERC4 symbols, namely 0-15, may be represented in the first column of the table, additional symbols may be added to ensure expandability and compatibility. In this regard the two (2) guard bands represent the sixteenth (16$^{th}$) and seventeenth (17$^{th}$) symbols, but other symbol locations could be used for this purpose. As a practical matter, 5 bits will be required to represent the eighteen (18) symbols. Accordingly, there is enough space to define additional symbol mappings. These are represented as 31 spare symbols 14-31. The ability to provide additional symbols which may be defined at a later date, even post silicon, may be controlled externally to enable more symbols to be transmitted in accordance with an embodiment of the invention.

Figure 3:
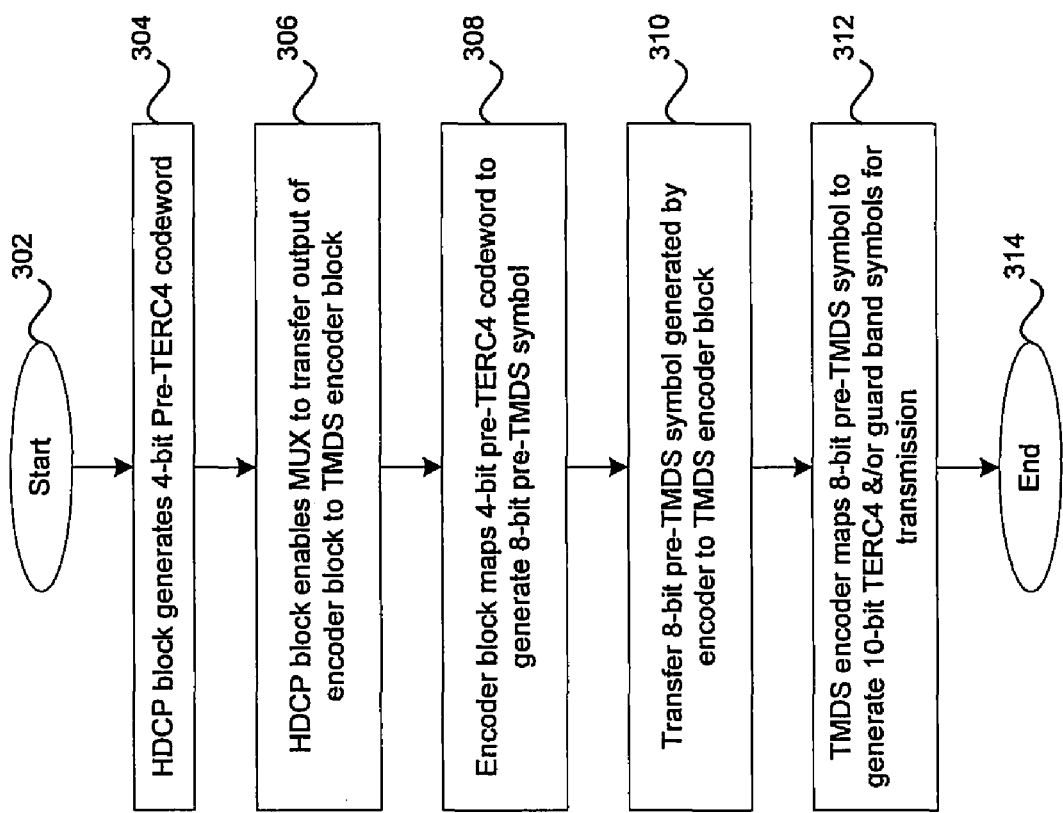
FIG. 3 is a flow chart illustrating exemplary steps that may be utilized by the transmitter of FIG. 1 for encoding data in accordance with an embodiment of the invention.

FIG. 3 is a flow chart illustrating exemplary steps that may be utilized by transmitter 102 of FIG. 1 for encoding data in accordance with an embodiment of the invention. Referring to FIG. 3, the exemplary steps may start at step 302. In step 304, the HDCP block may generate a 4-bit pre-TERC4 codeword. In step 306, the HDCP block may enable the MUX to transfer the output of the encoder block to the TMDS encoder. In step 308, the encoder block may map the 4-bit pre-TERC4 symbol to the 8-bit pre-TMDS symbol. In step 310, the 8-bit pre-TMDS symbol generated by the encoder block may be transferred to the TMDS encoder block. In step 312, the TMDS encoder block may map the 8-bit pre-TMDS symbol to a 10-bit TERC4 and/or guard band symbols for transmission. Finally, the exemplary steps may end with step 314.

Figure 4:
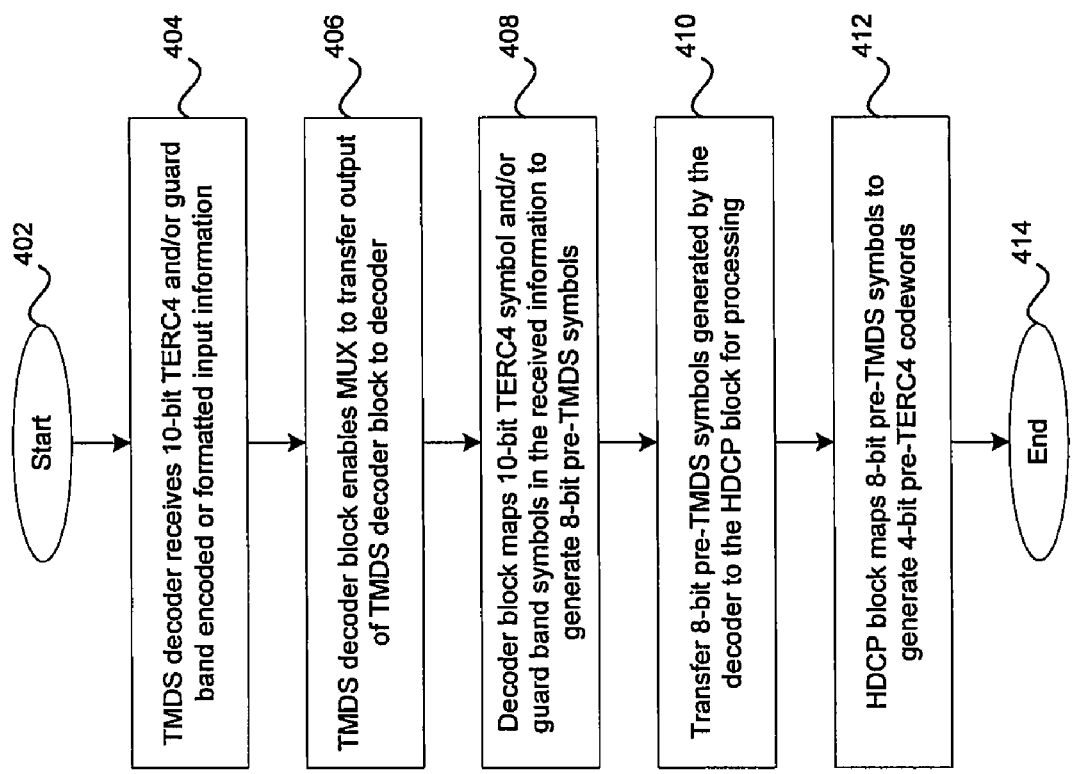
FIG. 4 is a flow chart illustrating exemplary steps that may be utilized by the receiver of FIG. 2 for decoding data in accordance with an embodiment of the invention.

FIG. 4 is a flow chart illustrating exemplary steps that may be utilized by receiver 202 of FIG. 2 for decoding data in accordance with an embodiment of the invention. Referring to FIG. 4, the exemplary steps may start with step 402. In step 404, the TMDS decoder block may receive 10-bit formatted TERC4 and/or guard band encoded or formatted information. In step 406, the TMDS decoder block may enable the MUX to transfer an output of the TMDS decoder block to the decoder. In step 408, the decoder block may map the 10-bit formatted TERC4 and/or guard band symbols in the received information to generate 8-bit pre-TMDS symbols. In step 410, the 8-bit pre-TMDS symbols generated by the decoder block may be transferred to the HDCP block for processing. In step 412, the HDCP block may map the 8-bit pre-TMDS symbol to generate 4-bit pre-TERC4 codewords. Finally, the exemplary steps may end with step 414.

Referring to FIG. 3 and FIG. 4, it should be recognized that additional steps may be provided and various steps may be combined and/or rearranged without departing from the scope of the invention. For example, steps 306 and 308 of FIG. 3 may be interchanged and still accord with various embodiments of the invention. Similarly, steps 406 and 408 of FIG. 4 may be interchanged without departing from the scope of the various embodiments of the invention. Moreover, although not shown in FIG. 3, the TMDS encoder block 108 of transmitter 102 of FIG. 1, may directly encode an output of the HDCP block 102. In this regard, for example, the HDCP block 102 may enable an input of MUX 106 to directly transfer the output 112 of the HDCP block to the TMDS encoder block for TMDS encoding. Similarly, although not shown in FIG. 4, the HDCP block 202 of receiver 202 of FIG. 2, may directly decode an output of the TMDS decoder block 208. In this regard, TMDS decoder block 208 may enable an output of DEMUX 206 to directly transfer and output of the TMDS encoder block to the HDCP block 202 via HDCP input signal 212 for decoding.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing information, the method comprising:
   generating an HDCP codeword and a first symbol from the HDCP codeword; and
   generating at least one or more of a Transition Minimized Differential Signaling Error Reduction Coding (TERC4) symbol, a Transition Minimized Differential Signaling (TMDS) symbol and a guard band encoded symbol from at least a portion of said first symbol when said one or more of said TERC4 symbol, said TMDS symbol and said guard band encoded symbol is at least a portion of a signal to be transmitted.

2. The method according to claim 1, comprising TMDS encoding at least a portion of said HDCP codeword to generate a TMDS symbol for said at least a portion of said signal to be transmitted.

3. The method according to claim 2, comprising TMDS encoding at least a portion of said first symbol to generate a TERC4 symbol for said at least a portion of said signal to be transmitted.

4. A system for processing information, the system comprising:
   one or more circuits operable to create an HDCP codeword and a first symbol from the HDCP codeword; and
   said one or more circuits operable to generate one or more of a TERC4 symbol, a TMDS symbol and a guard band encoded symbol from at least a portion of said first symbol when said one or more of said TERC4 symbol, said TMDS symbol and said guard band encoded symbol is at least a portion of a signal to be transmitted.

5. The system according to claim 4, wherein said one or more circuits are operable to TMDS encode at least a portion of said HDCP codeword to generate a TMDS symbol for said at least a portion of said signal to be transmitted.

6. The system according to claim 5, wherein said one or more circuits are operable to TMDS encode at least a portion of said first symbol to generate a TERC4 symbol for said at least a portion of said signal to be transmitted.

7. A method for processing information, the method comprising:
   generating an HDCP codeword and TMDS encoding one or more symbols generated from the HDCP codeword to produce one or more of a TMDS encoded symbol, a TERC4 encoded symbol and a guard band encoded symbol; and
   transmitting one or more of said TMDS encoded symbol, said TERC4 encoded symbol and said guard band encoded symbol.

8. A system for processing information, the system comprising:
   a circuit operable to generate an HDCP codeword;
   one or more circuits operable to generate one or more symbols from the HDCP codeword and TMDS encode one or more symbols generated from the HDCP codeword to produce one or more of a TMDS encoded symbol, a TERC4 encoded symbol and a guard band encoded symbol; and
   said one or more circuits operable to transmit one or more of said TMDS encoded symbol, said TERC4 encoded symbol and said guard band encoded symbol.

9. A non-transitory computer-readable medium including program code thereon, which when executed by at least one computer implements a method comprising:

generating a HDCP codeword and TMDS encoding one or more symbols generated from the HDCP codeword to produce one or more of a TDMS encoded symbol, a TERC4 encoded symbol and a guard band encoded symbol; and causing transmission of one or more of said TMDS encoded symbol, said TERC4 encoded symbol and said guard band encoded symbol.

10. An apparatus for processing information comprising:
an HDCP block configured to generate an HDCP codeword;
at least one encoder configured to generate one or more symbols from the HDCP codeword and TMDS encode one or more symbols generated from the HDCP codeword to produce one or more of a TMDS encoded symbol, a TERC4 encoded symbol and a guard band encoded symbol; and
the at least one encoder configured to transmit one or more of the TMDS encoded symbol, the TERC4 encoded symbol, and the guard band encoded symbol.

11. An apparatus for processing information, the apparatus comprising:
means for generating an HDCP codeword and TMDS encoding one or more symbols generated from the HDCP codeword to produce one or more of a TMDS encoded symbol, a TERC4 encoded symbol and a guard band encoded symbol; and
means for transmitting one or more of the encoded TMDS encoded symbol, the TERC4 encoded symbol, and the guard band encoded symbol.

12. An apparatus for processing information comprising:
means for generating an HDCP codeword and a first symbol from the HDCP codeword; and
means for generating at least one or more of a Transition Minimized Differential Signaling Error Reduction Coding (TERC4) symbol, a Transition Minimized Differential Signaling (TMDS) symbol and a guard band symbol from at least a portion of the first symbol when the one or more of the TERC4 symbol, the TMDS symbol and the guard band symbol is at least a portion of a signal to be transmitted.

13. The apparatus according to claim 12, further comprising means for TMDS encoding at least a portion of the HDCP codeword to generate a TMDS symbol for the at least a portion of the signal to be transmitted.

14. The apparatus according to claim 13, further comprising means for TMDS encoding at least a portion of the first symbol to generate a TERC4 symbol for the at least a portion of the signal to be transmitted.

15. An apparatus for processing information comprising:
an HDCP block configured to create an HDCP codeword and a first symbol from the HDCP codeword; and
at least one encoder configured to generate one or more of a TERC4 symbol, a TMDS symbol and a guard band encoded symbol from at least a portion of the first symbol when the one or more of the TERC4 symbol, the TMDS symbol and the guard band encoded symbol is at least a portion of a signal to be transmitted.

16. The apparatus according to claim 15, wherein the at least one encoder is configured to TMDS encode at least a portion of the HDCP codeword to generate a TMDS symbol for the at least a portion of the signal to be transmitted.

17. The apparatus according to claim 16, wherein the at least one encoder is configured to TMDS encode at least a portion of the first symbol to generate a TERC4 symbol for the at least a portion of the signal to be transmitted.

18. A non-transitory computer-readable medium including program code thereon, which when executed by at least one computer implements a method comprising:
generating an HDCP codeword and a first symbol from the HDCP codeword; and
generating at least one or more of a Transition Minimized Differential Signaling Error Reduction Coding (TERC4) symbol, a Transition Minimized Differential Signaling (TMDS) symbol and a guard band encoded symbol from at least a portion of the first symbol when the one or more of the TERC4 symbol, the TMDS symbol and the guard band encoded symbol is at least a portion of a signal to be transmitted.

19. The non-transitory computer-readable medium of claim 18, wherein the implemented method further comprises:
TMDS encoding at least a portion of the HDCP codeword to generate a TMDS symbol for the at least a portion of the signal to be transmitted.

20. The non-transitory computer-readable medium of claim 19, wherein the implemented method further comprises:
TMDS encoding at least a portion of the first symbol to generate a TERC4 symbol for the at least a portion of the signal to be transmitted.

* * * * *